United States Patent [19]

Hurford

[11] 3,855,419

[45] Dec. 17, 1974

[54] PWN MULTIPLEX SYSTEM

[75] Inventor: Winslow Leroy Hurford, Cape Coral, Fla.

[73] Assignee: RCA Corporation, New York, N.Y.

[22] Filed: Aug. 22, 1973

[21] Appl. No.: 390,433

Related U.S. Application Data

[63] Continuation of Ser. No. 206,487, Dec. 9, 1971, abandoned.

[52] U.S. Cl. .......................... 179/15 AW, 179/15 A

[51] Int. Cl. .............................................. H04j 7/00

[58] Field of Search... 179/15 AW, 1 B, 15 A, 15 BC; 329/106

[56] References Cited

UNITED STATES PATENTS

| | | | |
|---|---|---|---|
| 2,861,257 | 11/1958 | Weintraub | 179/15 AW |
| 3,248,718 | 4/1966 | Uemura | 179/15 A |
| 3,473,050 | 10/1969 | Groom | 329/106 |
| 3,535,657 | 10/1970 | Webb | 329/106 |
| 3,566,038 | 2/1971 | Slavin | 179/1 B |
| 3,651,454 | 3/1972 | Venema | 340/52 F |

*Primary Examiner*—David L. Stewart
*Attorney, Agent, or Firm*—Eugene M. Whitacre; Charles I. Brodsky

[57] ABSTRACT

There is disclosed a multiplex system for use in a large studio complex. The system employs a modulator for providing at an output a pulse width modulated waveshape indicative of the status of a control function. A plurality of such pulse width modulated waveshapes are multiplexed and transmitted via a common cable to a remote location where the signals are demultiplexed and then time stretched in order to obtain a control voltage of a magnitude corresponding with the status of the control functions.

6 Claims, 4 Drawing Figures

PWN MULTIPLEX SYSTEM

Figure 1A:
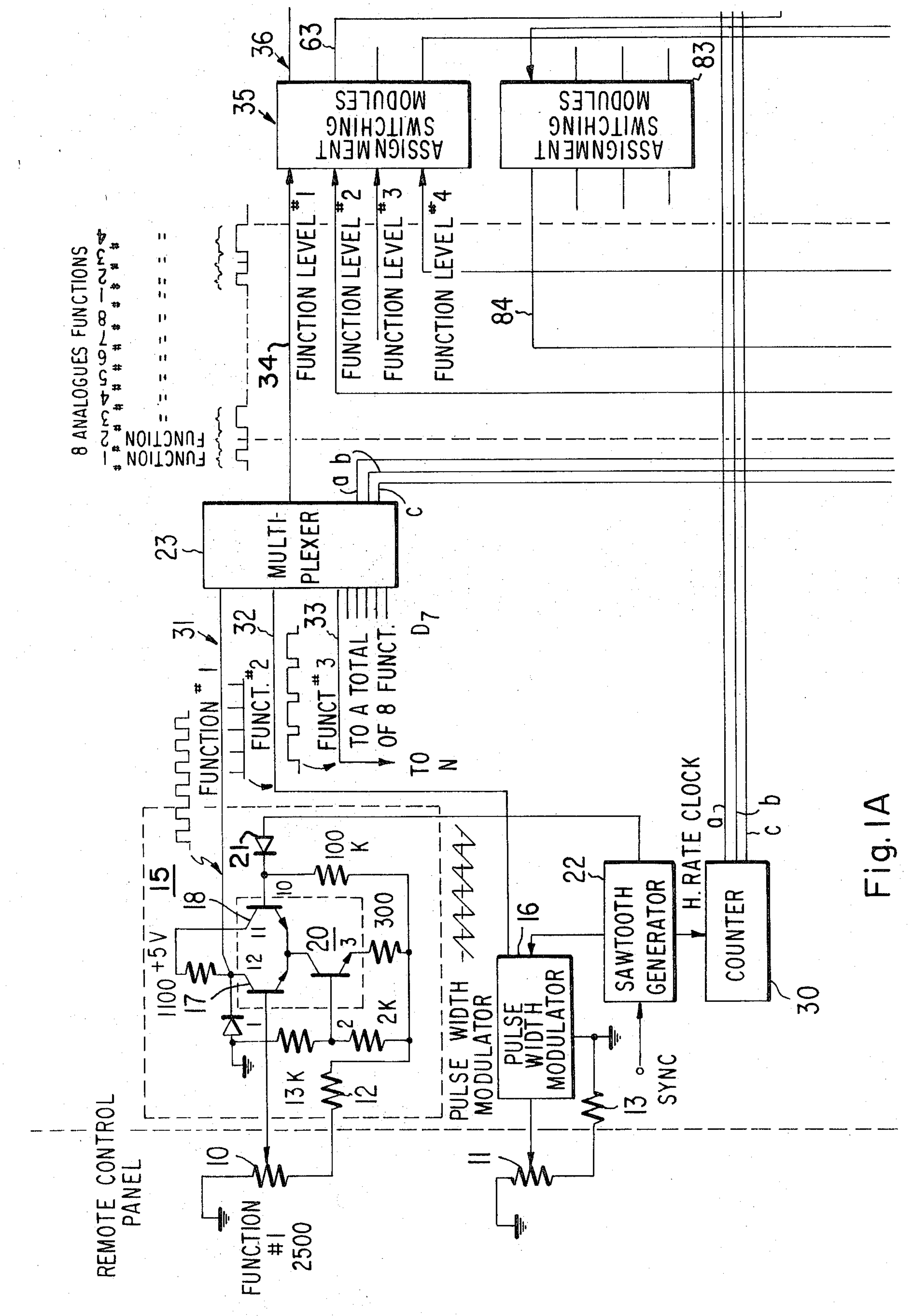

This is a continuation, of application Ser. No. 206,487, filed Dec. 9, 1971, now abandoned.

This invention relates to a multiplex system and, more particularly, to such a system utilized for reducing the amount of interconnecting wires between a central control location and a remote equipment area.

The concept of multiplexing is well known and is commonly utilized to permit a plurality of individual channels to be transmitted via a common communication path such as a cable or a radio link.

Multiplexed systems which are concerned with the transmission of analog data, such as voice, operate to combine a number of channels into a single communications channel by using a relatively rapid scanning technique to maintain complete intelligibility. Such multiplexed systems are conveniently employed in telephony and other communication fields as well.

It has also been known to utilize multiplexing concepts to reduce the number of wires in order to afford the coupling of control signals from one place to another. The signals utilized in such systems may be representative of AC and DC control voltages and have been used, for example, in airplane wiring systems and so on, mainly to reduce the amount of wire and hence afford a savings in the total weight.

Presently, there is a need for television studios which are relatively large and complex operations. Such studios necessarily include a plurality of devices which are needed for the production of television programs. Such devices include television cameras, tape recorders, film transports and so on.

In a large studio operation there may be a large number of discrete locations such as individual recording rooms where such equipment may be utilized. The operation of such a complex should desirably be under the control of a central operation. At such a central operation there may be included a master console where one or more operators in attendance may serve to control various programming functions as well as remotely controlling such equipment as cameras and so on.

The more complex such a studio operation becomes, the greater the requirement for controllability both of analog and digital information from the master console, which control has to be accomplished over fairly large distances.

If each control function were propagated on an individual wire, which would be the obvious approach, the number of wires would multiply rapidly, thus resulting in a very complicated system.

This difficulty is further complicated by the fact that one would also desire to control certain analog functions as for gain control, intensity, and so on. Many analog functions are under control of a potentiometer which would be a remote device located on the console. Such a potentiometer might vary a voltage utilized, for example, in a remote amplifier. In order to accomplish this, one would need to run three wires corresponding to the top and bottom terminals of the potentiometer and the variable arm. This presents a further multiplication of wiring problems coupled with the great susceptibility of cross-talk and other types of interference due to the long length and large number of such leads.

This invention provides a multiplex system useful for reducing the number of wires between a control area and an equipment area such as in a television studio.

The novel features of this invention relate to a unique scheme of separating the multiplexed signal and deriving at an output a control voltage which is representative of the control signal before the multiplex operation. The concept results in structure which is inexpensive and simple to implement, thus providing a substantial savings over prior art techniques.

The features of this invention are accomplished by multiplexing means having a plurality of input terminals and a single output terminal which terminal is coupled to a common communications path. Each of the input terminals are coupled to separate ones of control function devices and are responsive to these levels to provide at the output terminal a series of pulses, each one of which is indicative of the status of one of said control function devices.

Demultiplexing means is coupled to the common path at a remote location. The demultiplexing means has a plurality of output terminals responsive to a series of pulses on the input terminal to provide a plurality of pulse series, one for each output terminal, wherein each pulse in any one of said series is indicative only of the status of one of said control function devices and each of the pulse series has a periodicity less than the periodicity of said signal propagated along said common path, a plurality of pulse stretching means each having an input and output terminal, each of said means having said input terminal coupled solely to one output terminal of said demultiplexing means for providing at the output terminal of said stretching means a remote control voltage of a magnitude according to the magnitude of one of said control function levels.

Figure 1B:
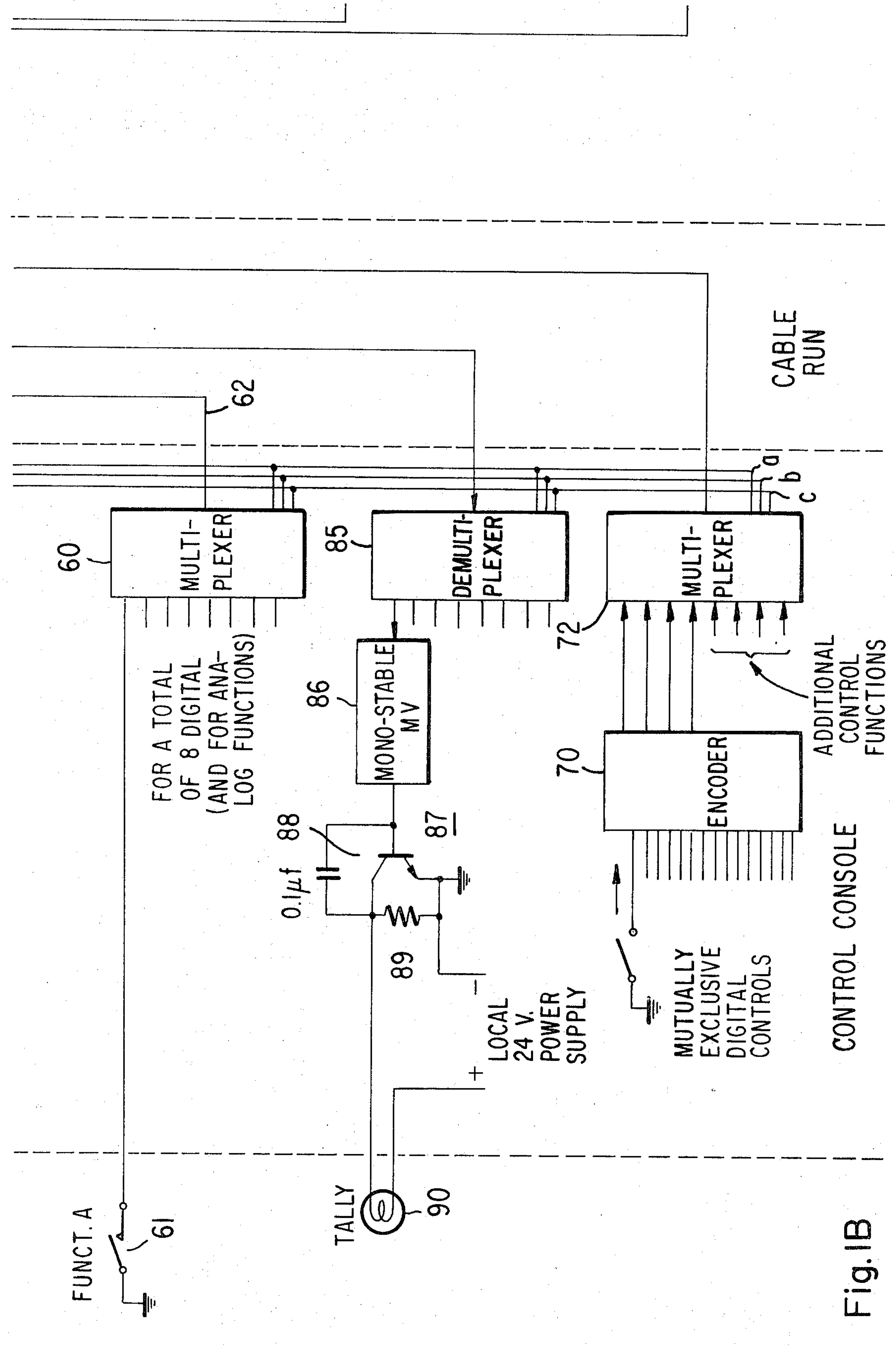
Figure 1C:
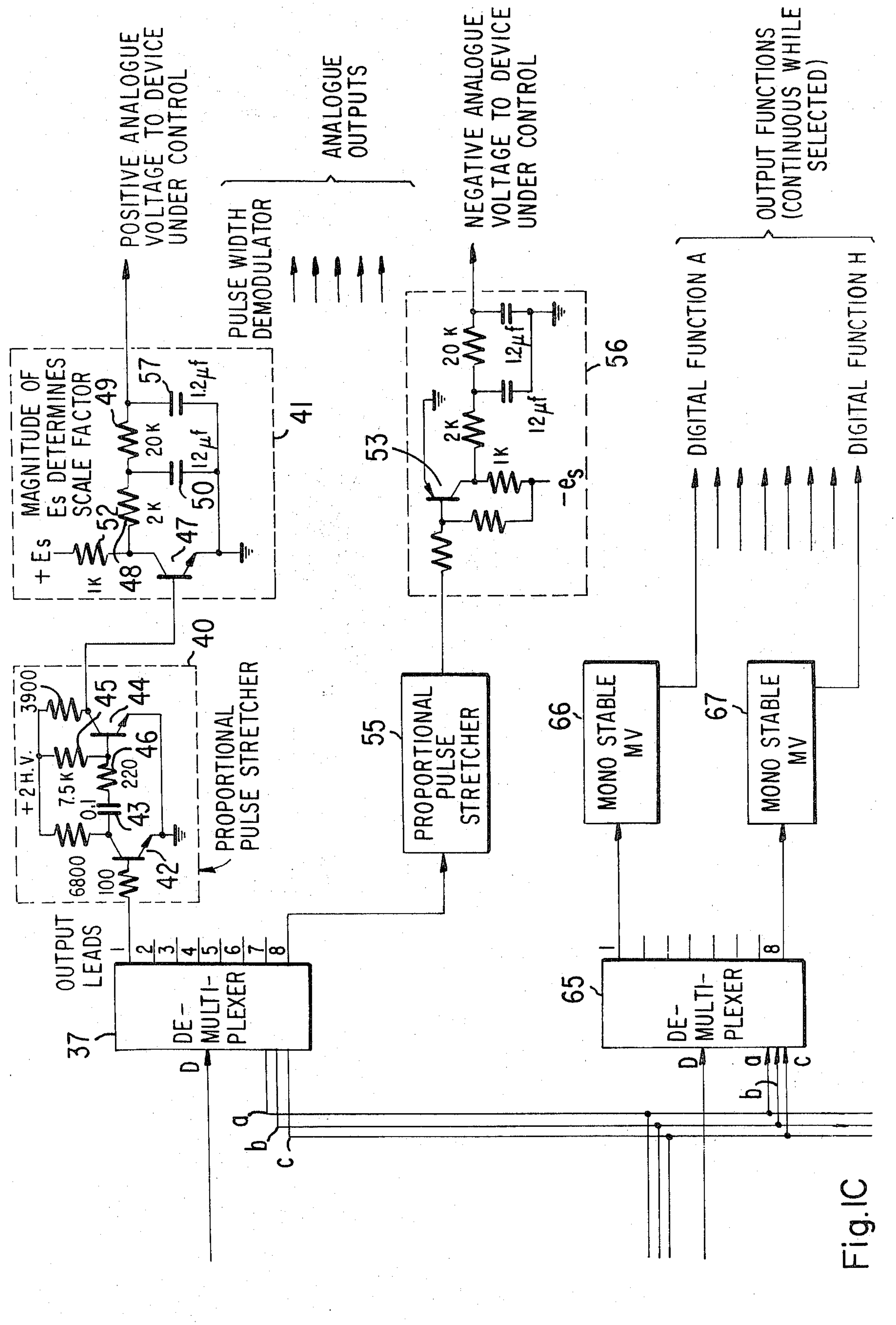
Figure 1D:
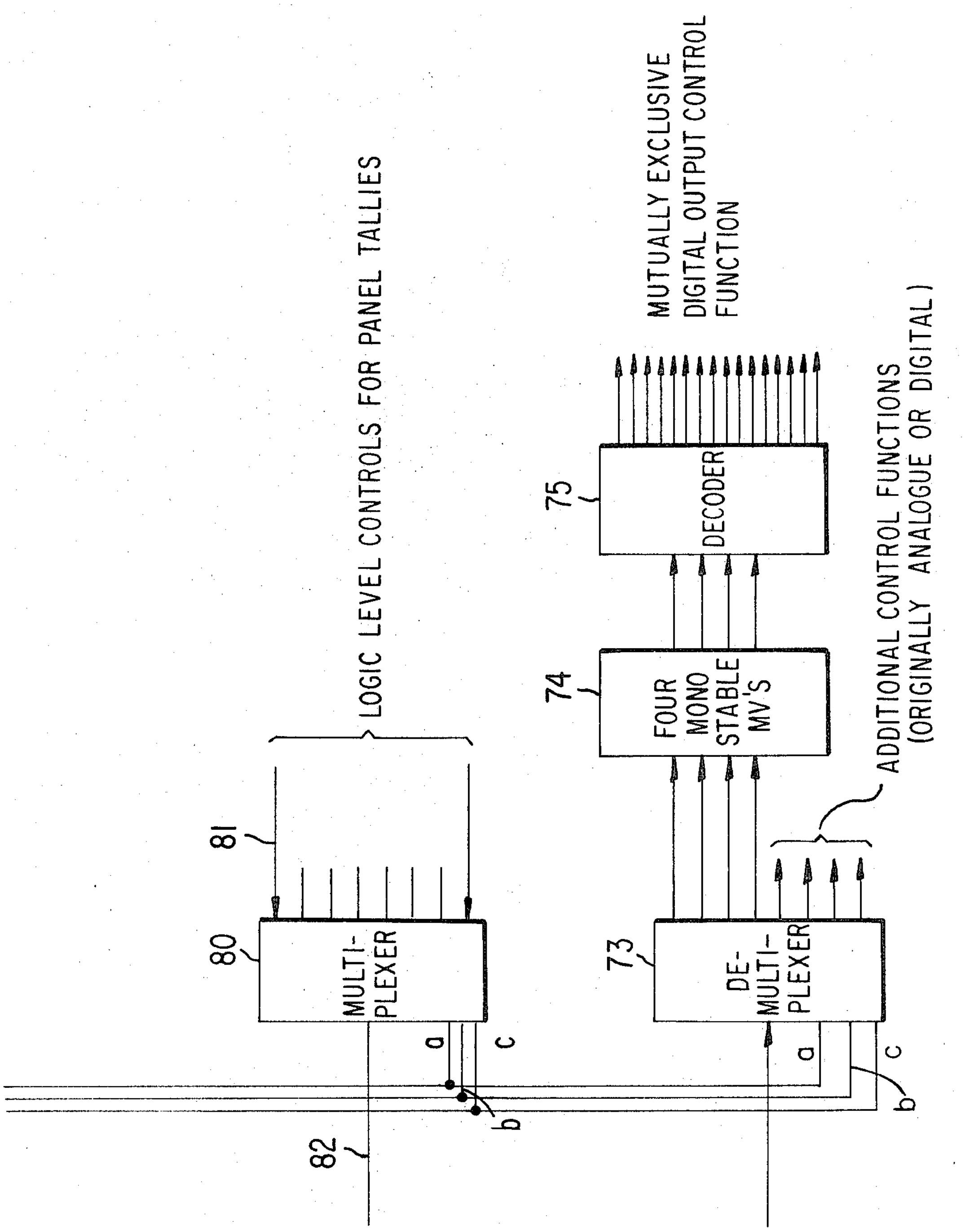

For a detailed description of the invention, reference will be made to the following specification when read in conjunction with FIGS. 1A–1D (hereinafter "the FIGURE") which represent a multiplex system according to this invention for transmitting a plurality of control voltages over signal wires directed between a control console and a remote equipment area.

Referring to the FIGURE, there is shown a studio control system useful for routing and directing both analog and digital information from a console or central location to a remote equipment area. The portion of the FIGURE included between the dashed lines indicate the cables necessary between both locations in order to transmit the requisite analog and digital information.

Basically, as briefly described above, the control console in a large studio operation should contain necessary control potentiometers, and so on, in order to optimally control the characteristics of remote amplifiers and remote equipment in general.

In order to simplify the following discussion, the system will be described in terms of analog control, digital control and tally or monitoring status indication.

Referring to the FIGURE, there is shown, for example, two potentiometers 10 and 11, each of which comprises a portion of a voltage divider formed with additional resistors 12 and 13, respectively. Each potentiometer as 10 and 11 functions to provide a varying voltage, which voltage is used to determine the gain of a remote amplifier, for example, or some other remote equipment capable of varying one or more characteristics according to a predetermined DC level. Although two potentiometers are shown in this FIGURE, it is understood that more than two may be used to accomplish the desired control. In this particular example, the implementation of circuitry for eight such potentiometers as 10 and 11 will be assumed.

If one desired to locate the potentiometer 10, for example, on a remote control panel and to use the variable voltage present at its tap to perform gain control at a remote location, at least two wires would be necessary based on the assumption that the entire grounding system for both the control console and the remote equipment area is the same.

The variable arm of potentiometer 10 is coupled to one input of a pulse width modulator circuit 15. The variable arm of potentiometer 11 is likewise coupled to an input of a pulse width modulator circuit 16, and other potentiometers, not shown, also have their variable arms similarly coupled.

Basically, the pulse width modulator 15 as shown in conjunction with potentiometer 10 comprises a differential amplifier configuration including transistors 17 and 18 and a constant current source transistor 20. The base electrode of transistor 17 is coupled to the variable arm of potentiometer 10, while the base electrode of transistor 18 is coupled via a diode 21 to the output of a sawtooth generator 22. The sawtooth generator may be of conventional design and is synchronized to the horizontal synchronizing interval of the television system which, for example, would be 15,750 Hz for the NTSC system.

The desired analog voltage level is set by an operator who adjusts the potentiometer 10 in response to an effect which he may see on a television monitor or other type of indicating device, not shown.

The DC level present at the variable arm of potentiometer 10 is, as indicated, applied to one side of the differential amplifier. This DC level is compared with the sawtooth voltage present at the base electrode of transistor 18.

A conduction period of the differential amplifier is determined by the difference between the DC voltage at the variable arm of potentiometer 10 relative to the instantaneous value of the sawtooth waveform. In such a circuit configuration, it is obvious that the panel potentiometer 10 may be set so that the differential amplifier conducts all of the time, not at all, or for any desired intermediate duration.

The output of the differential amplifier available at the collector of transistor 17 is therefore a pulse train wherein the pulses are of a variable width, which width is varied according to the setting of the potentiometer 10. This variable width pulse train, as shown, is applied to one input of a multiplexer 23.

The multiplexer 23 basically consists of a plurality of AND gates having a common output terminal. Each of the gates is driven by a different phase of a clock which is developed by a counter 30, also operated at the horizontal rate.

Three outputs of the counter 30 are shown, for example, and are connected to the three inputs of the multiplexer module 23. The multiplexer 23 is a sequential scanning device which scans the function lines 31, 32, 33 and so on in a predetermined sequence and places the parallel information on the function lines in series on a common output line 34. In this manner, there is shown a continuous pulse train on the output lead 34, which is comprised in turn of a pulse determinative of function No. 1, a second sequential pulse determinative of function No. 2, and a third sequential pulse determinative of function No. 3 and so on.

Each of the pulses on the output line 34 are of the same width as the corresponding pulse determinative of that particular function. For example, the first pulse on the output line 34 is the same width as a pulse on the function line 31. Similarly, the second pulse on the output line 34 is of the same width as the pulse on the input function line 32. However, it can be seen from the diagram shown in the FIGURE that the repetition rate of each of the pulses within the multiplexed series has decreased as a function of the number of input function lines multiplexed.

In this example, eight input function lines are coupled to multiplexer 23. Therefore, the effective repetition rate of an individual function pulse has decreased by a factor of eight. It is, however, noted that the line or cable 34 now carries information representative of eight unique potentiometers, each of which is located on the remote control panel.

The cable 34 constitutes the entire signal information cable connection for the eight potentiometers as 10 and 11 and is located between the console area and the remote equipment area. The cable 34 is shown coupled at the equipment area to an assignment switching module 35. The function of the assignment switching module 35 will be described subsequently.

In order to fully understand the present invention, it will be assumed that there is a direct connection via module 35 enabling the signal on line 34 to be applied to the cable 36 at the output of the assignment switching module 35. This cable 36 is directed to a demultiplexer module or decoder 37.

Essentially, the demultiplexer 37 is a circuit which takes the serial information present on cables 34 and 36 and converts this information back to parallel information at its outputs. This again can be accomplished by a plurality of AND gates, each having one input common with cable 36 and another input which is sequentially derived from counter 30 to assure synchronism and time coincidence of each multiplexed time slot.

The outputs of demultiplexer 37 are designated respectively as 1-8 to correspond to the eight input function lines accommodated by multiplexer 23. Each demultiplexer output line emanating from demultiplexer 37 carries a pulse width modulated waveform, where the pulse width is the same as the pulse width on each corresponding input function line as 31–33.

However, the repetition rate on each output line is one-eighth of that on the input function lines. It would be highly desirable in order to perform control at the remote equipment area to convert this effective decrease in duty cycle range in order to obtain optimum DC for control purposes. For example, the series of pulses available at an output line of demultiplexer 37 may have an effective duty cycle from 0–12.5 percent as compared to a duty cycle of the series of pulses emanating at the input function lines of 0–100 percent.

It is therefore desirable to convert the duty cycle of the pulses available at the output of demultiplexer 37 to 0–100 percent. This objective is achieved by stretching the received pulses at an output of demultiplexer 37 by a factor of N times, where N is equal to the number of multiplexed lines, in this example, eight.

Shown coupled to output lead 1 of demultiplexer 37 is a proportional pulse stretcher circuit 40. The output of the pulse stretcher 40 is coupled to a pulse width demodulator circuit 41. There is one proportional pulse stretcher as 40 and one demodulator as 41 for each of the eight output lines emanating from the demultiplexer 37. A representative example is also shown for output lead 8 having a proportional pulse stretcher 55 coupled to a pulse width demodulator 56, which demodulator 56, as will be explained, is arranged to provide an opposite polarity control signal when compared with that signal at the output of demodulator 41.

The proportional pulse stretcher 40 operates as follows. The output lead 1 of the demultiplexer 37 is DC coupled to the base electrode of a transistor 42. The quiescent voltage at the output lead of demultiplexer 37 is of such a polarity that, with no signal available, transistor 42 is conducting.

A pulse contained in the pulse width modulated signal on lead 1 causes transistor 42 to cut off. During this time capacitor 43 begins to charge towards B+. The amount that the capacitor 43 charges is strictly determined by the width of the input pulse which causes transistor 42 to cut off. When the input pulse ends, transistor 42 commences conduction and transistor 44 is cut off. Transistor 44 remains in cut off for a length of time determined by the time constant formed by capacitor 43 and resistors 45 and 46. This time constant is also affected by the amount of charge stored on capacitor 43 during the input pulse. Therefore, the amount of time that transistor 44 is cut off is a function of the above-noted time constant and the above-noted stored charge which therefore indicates that transistor 44 will be cut off for time greater than the input pulse.

By a proper choice of the time constant relative to the pulse repetition rate, the input pulse may be effectively stretched in time at the collector of transistor 44 by a desired factor. The output pulse train available at the collector of transistor 44 has a duty cycle range of 0 to and including 100 percent and is applied to the pulse width demodulator 41.

The pulse width demodulator 41 includes a discharge transistor 47 having a collector electrode coupled to an output low pass filter including resistors 48 and 49 and capacitors 50 and 51. This filter is designed so as to substantially attenuate the pulses from the discharge transistor 47. The filter capacitors 50 and 51 are charged from the $+E_s$ supply via the collector resistor 52 chosen to provide the desired scale factor or to provide the maximum desired output control voltage when the pulse duty cycle is zero. When the input pulse duty cycle is 100 percent, transistor 47 conducts all the time and the analog output voltage is essentially zero. By varying the conduction time, any desired intermediate value of voltage may be obtained.

It is also noted by reference to the pulse width demodulator 56 that by utilizing an opposite conductivity transistor 53 in place of transistor 47 and opposite polarity supply designated as $-e_s$, a negative analog voltage may also be obtained to perform control as indicated.

It is also noted that the remote control potentiometers as 10 and 11 can operate exactly the same from the same polarity source independent of whether a negative or positive voltage is desired at the remote equipment area.

DIGITAL SIGNAL CONTROL

Referring to the FIGURE, there is also shown a multiplexer module 60, which is also operated from counter 30 and has eight input digital lines, one of which is shown as a function A line, which is coupled to a normally opened switch 61. The other seven lines are similarly coupled to similar switch modules, not shown, and are multiplexed on the single output line 62.

The output line 62 is coupled through the assignment switching module 35, which can apply the signal content on line 62 to line 63, which is coupled to the input of a demultiplexing module 65. The output of the demultiplexing module 65 has eight output lines, each of which is coupled to a corresponding monostable multivibrator as 66 and 67, for example.

Basically, the demultiplexing technique is similar to the analog technique described above with the exception that the digital signal contains information only representative of any one of two states of a switch as 61. This information therefore determines whether or not the function switch is opened or closed. Normally for providing this digital function control, at least eight leads would be necessary to couple eight such switches as 61 to the remote equipment area. In this example, the information capable of being carried by eight leads are transmitted via the common lead 62.

The multiplexing and demultiplexing operation for this digital control takes place similarly to that indicated above except that the output pulse train on line 62 is a series of sequential pulses, each one of which is associated with a different function switch and each is of the same width. The demultiplexed pulses are also of the same width as the pulses on line 62, but the duty cycle is again decreased by a factor equal to the number of multiplexed lines. These pulses are coupled to the input of a monostable multivibrator as 66, which is of the type providing a continuous level as long as the pulses exist on the input lines. Therefore, if switch 61 is closed, the monostable multivibrator 66 provides one continuous signal level at the output designated as digital function A. If switch 61 is opened, another continuous level is provided at the output.

Thus, the above-described scheme provides two distinct output levels representative of the two possible conditions for switch 61 and other associated switches. Such digital control switches may, for example, represent a disable or an able signal for a remote piece of equipment and so on.

There is also shown another approach for the transmission of digital information which utilizes an encoder 70 having coupled to the inputs thereof a plurality of digital control function switches as 71. If these control functions are mutually exclusive, a further reduction in wiring requirements can be affected by encoding the signals prior to application to the multiplexer 72. When utilizing mutually exclusive digital functions in conjunction with an encoding device, one may obtain a further reduction in the number of output lines emanating from the decoder.

The output of the multiplexer 72 is again shown directed to an input of the assignment switch 35 and thence to a demultiplexer 73 having coupled to each of the four outputs a separate monostable multivibrator included in module 74 and performing a function similar to that described for multivibrators 66 and 67. The outputs of the monostable multivibrators are then supplied to a decoder circuit 75 to obtain the plurality of mutually exclusive digital output control functions to be utilized to perform suitable control at the remote equipment location.

It is of course understood that the basic operation of the multiplexer, demultiplexer scheme used in conjunction with exclusive digital control signals is similar to that described above.

TALLY CONTROL

Basically, tally control may also be referred to as system status indication, and the main objective is to monitor signals emanating from the remote control location by means of indicating the status of certain predesired points. This enables the operator at the control console to ascertain that the proper function has been implemented at the remote equipment area or to follow the status of a particular piece of equipment as indicating a busy or an idle condition and so on.

Status control is performed by a multiplexer 80, which has a plurality of inputs (eight) as 81 coupled to the input terminals. A single output lead 82 is routed from the remote equipment area via an assignment switch 83 and thence applied via cable 84 to the input of a demultiplexer 85.

As described above, any particular tally control signal is present at the outputs of the demultiplexer only one-eighth of the time. The other seven-eighths of the time is used to transmit seven other control signals via cables 82 and 84.

The multiplexed output is routed by the assignment switcher 83 to the console and an associated control panel for display. Each output line of the demultiplexer 85, which exists for only one-eighth of the former period, is applied to a monostable multivibrator 86. This multivibrator 86 is similar to 66 and 67 and is of a type which can be retriggered for a full period while it is still in the process of discharging due to a previous trigger.

By selecting the time constant associated with multivibrator 86, one can cause it to remain in the active state for as long as it is being retriggered. When the trigger pulses terminate, it will discharge reverting to an off state, thereby giving a true reproduction of the input control signal with a negligible delay.

The output of monostable multivibrator 86 is applied to the input of a lamp driver circuit 87. Lamp driver circuit 87 includes a transistor 88 arranged in a common emitter configuration and having an input base electrode. The collector of the transistor is coupled to a source of potential as shown via an indicator lamp 90. A resistor 89 coupled between the collector and the grounded emitter serves to supply a small filament current for the lamp to afford more reliable operation. Therefore, as long as the multivibrator 86 remains in the active or triggered state, the lamp 90 would be lit. As soon as the monostable multivibrator returns to the off state, lamp 90 is extinguished. The tally indication associated with lamp 90 changes accordingly.

It is of course seen that the concept of multiplexing and period reduction is another advantage in regard to this particular embodiment in that the lamp driver and transistor 88 can conveniently be located at the console together with its associated power supply. This avoids the fairly high voltage drop that might otherwise be encountered when utilizing long cable runs between console and remote equipment area.

ASSIGNMENT SWITCHING

As previously indicated, the modules 35 and 83 designated as assignment switching modules basically consist of a plurality of switches which can be controlled at the remote equipment area, for example, and enable selective control of one or more functions. For example, the assignment switching module may permit lead 34 associated with multiplexer 23 to be applied to lead 36 associated with the demultiplexer 37, or alternatively, this connection may be broken by means of appropriate switching in the assignment module areas. If this occurred the various analog functions would now be solely under the control of the operators present at the remote equipment area. In a similar manner the digital functions as, for example, that represented by switch 61, could be switched in and out of control via the assignment switching module 35.

Such assignment switches are known in the art and can be implemented in many different ways and are necessary to provide a degree of isolation between the control console and the remote equipment area as briefly described above.

What is claimed is:

1. Apparatus for transmitting a plurality of individual information signals related to the status of a number of control function devices located at a first location and each indicative of a predetermined level necessary to perform a desired control function at a location remote from said first, by multiplexing said information signal levels and transmitting the same via a common linkage between said first location and said remote location, comprising:

a. multiplexing means at said first location, having a plurality of input terminals and a single output terminal coupled to said common linkage, each of said input terminals being coupled to separate ones of said control function devices and responsive to said information signal levels for providing a single series of pulses at said output terminal, with the width of each pulse of said series being indicative of the status of individual ones of said control function devices such that each control function to be performed is represented by the position and width of a single pulse in said series, and with said series of pulses having a given periodicity, b. demultiplexing means at said remote location, having a single input terminal coupled to said common linkage and a plurality of output terminals, said demultiplexing means being responsive to individual pulses within said single series of pulses at its input terminal to generate a plurality of pulse series, one for each output terminal, with the width of each pulse in individual ones of said plurality of series corresponding to the width of that pulse in said single series which generated it to indicate only the status of that one of said control devices governing the function to be performed and with each of said plurality of pulse series having a periodicity less than said given periodicity by a factor equal to the number of said control function devices, c. a plurality of pulse stretching means, each having an input and an output terminal, with said input terminal being coupled solely to one separate output terminal of said demultiplexing means, for providing at the output terminal of each stretching means one of said plurality of pulse series at an increased periodicity up to but not exceeding that provided by said multiplexing means, and d. means coupled to the output terminals of said pulse stretching means for generating control signals from said plurality of pulse series which correspond in level to said information signals indicative of the status of each control function device at said first location.

2. The apparatus according to claim 1 wherein said last-mentioned means includes a plurality of monostable multivibrators, each having an input and output terminal.

3. The apparatus according to claim 1 wherein said plurality of control function devices comprises:

a. a plurality of digital function switches each one capable of being in one of two states wherein a first state represents an on condition and a second state represents an off condition.

4. The apparatus according to claim 1 wherein said last-mentioned means includes:

a. a lamp driver circuit including a transistor arranged in a common emitter configuration and having an input base electrode coupled to the output of one of said pulse stretching means, and an output collector electrode, and b. an indicator lamp coupled to said collector electrode for emitting a visual indication when said base electrode of said transistor is activated by said pulse stretching means.

5. Apparatus for transmitting a plurality of individual information signals related to the status of a number of control function sources located at a first location and each indicative of a predetermined control signal level for performing a desired control function at a location remote from said first location, by multiplexing said information signal levels and transmitting the same via a common linkage between said first location and said remote location, comprising:

a. a plurality of modulators, each one responsive to a separate one of said control signals for providing at an output thereof a pulse width modulated signal characterized by a series of pulses of fixed periodicity, each pulse in said series further having a width determined by the magnitude of said associated information signal, b. multiplexing means having a plurality of input terminals and a single output terminal, each of said input terminals coupled to the output of a separate one of said modulators to provide at the output terminal of said multiplexing means a new series of pulses from a first to a last, each pulse having a width according to the width of said pulse at the output of each separate modulator, whereby said first pulse in said new series has a width corresponding to the width of any one pulse at the output of a first one of said modulators, said last pulse has a width corresponding to the width of any one pulse at said output of a last one of said demodulators, and intermediate pulses have widths corresponding to the widths of pulses at the outputs of the others of said plurality of modulators, said new series of pulses being at a periodicity directly related to the number of the plurality of modulators, c. demultiplexing means having a single input terminal coupled to said single output terminal of said multiplexer means to derive at a plurality of output terminals a plurality of individual pulse series, each one of which is associated with one of said plurality of output terminals and with each pulse in an individual series having a width equal to the width of said pulses at the output of said modulators and a periodicity approximately equal to said fixed periodicity divided by the number of said plurality of modulators, d. a plurality of pulse stretching means, each having an input and an output terminal and arranged from a first one to a last one, said input terminal of said first pulse stretching means being coupled to one of said plurality of output terminals of said demultiplexing means, said input terminal of said last pulse stretching means being coupled to another of said plurality of output terminals of said demultiplexing means, and said input terminal of the others of said plurality of pulse stretching means being coupled to remaining ones of said plurality of output terminals of said demultiplexing means, with each of said pulse stretching means being responsive to said associated demultiplexed pulse series to provide therefrom another pulse series related to the demultiplexed series by a constant pulse width multiplication factor, the maximum pulse width of said another pulse series not exceeding the period of repetition of said new series of pulses, and e. means coupled to the output terminal of said pulse stretching means for generating control signals from said another pulse series which correspond in level to said information signals indicative of the status of each control function device at said first location.

6. The apparatus according to claim 5 further comprising:

a. a pulse source coupled to said multiplexing means and to said demultiplexing means for providing synchronizing signals thereto operative to provide synchronization of said associated pulse series available at the outputs of said multiplexing and demultiplexing means.

* * * * *